(12) United States Patent
Chang et al.

(10) Patent No.: US 12,339,449 B2
(45) Date of Patent: Jun. 24, 2025

(54) HEAD MOUNTED DEVICE

(71) Applicant: HTC Corporation, Taoyuan (TW)

(72) Inventors: Li-Hsun Chang, Taoyuan (TW);
Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 520 days.

(21) Appl. No.: 17/884,567

(22) Filed: Aug. 10, 2022

(65) Prior Publication Data

US 2024/0053607 A1 Feb. 15, 2024

(51) Int. Cl.
*G02B 27/01* (2006.01)
*G02C 5/22* (2006.01)

(52) U.S. Cl.
CPC ......... *G02B 27/017* (2013.01); *G02C 5/2254* (2013.01); *G02B 2027/0178* (2013.01)

(58) Field of Classification Search
CPC .......... G02B 27/017; G02B 2027/0178; G02B 27/0176; G02C 5/2254; G02C 3/003; G02C 5/14
See application file for complete search history.

(56) References Cited

U.S. PATENT DOCUMENTS

| | | | |
|---|---|---|---|
| 9,158,126 B1* | 10/2015 | Sullivan | G02C 3/003 |
| 2016/0370856 A1 | 12/2016 | Chang | |
| 2021/0080747 A1 | 3/2021 | Ragonese | |
| 2021/0311323 A1 | 10/2021 | Uchida | |
| 2024/0045218 A1* | 2/2024 | Liu | G02B 27/0176 |

FOREIGN PATENT DOCUMENTS

| | | |
|---|---|---|
| CN | 213462201 | 6/2021 |
| CN | 114402249 | 4/2022 |
| CN | 115166980 | 10/2022 |
| TW | 201930957 | 8/2019 |

OTHER PUBLICATIONS

"Office Action of Taiwan Counterpart Application", issued on Mar. 20, 2023, p. 1-p. 5.

* cited by examiner

*Primary Examiner* — James C. Jones
(74) *Attorney, Agent, or Firm* — JCIPRNET

(57) ABSTRACT

A head mounted device includes a body, a first bracket, a second bracket, a first elastic sheet, and a second elastic sheet. The first bracket and a second bracket are respectively connected to opposite sides of the body. The first elastic piece is rotatably connected to a side of the first bracket away from the body. The second elastic sheet is rotatably connected to a side of the second bracket away from the body.

7 Claims, 4 Drawing Sheets

HEAD MOUNTED DEVICE

BACKGROUND

Technical Field

This application relates to a device, and in particular to a head mounted device.

Description of Related Art

With the increasing development of the technology industry, display devices are becoming more and more diversified in terms of type, function, and usage, and wearable display devices that can be worn directly on the user's body have also emerged in response. There are many types of head mounted display devices. Take the glasses type of head mounted display device as an example, after the user puts on this type of display device, in addition to seeing a three-dimensional image, the image will change with the user's head rotation, which can provide the user with a more immersive experience.

However, when the user plays games and moves too vigorously, there is a risk of dropping the glasses type head mounted display device if the legs of the glasses do not provide sufficient clamping force. Therefore, it is necessary to enhance the clamping force that the legs of the glasses can provide. However, because the size and shape of each person's head varies, some users may find the local pressure too much or uncomfortable to wear.

SUMMARY

The application provides a head mounted device that may improve the problem of uncomfortable wearing.

The head mounted device of the application includes a body, a first bracket, a second bracket, a first elastic sheet, and a second elastic sheet. The first bracket and the second bracket are respectively connected to opposite sides of the body. The first elastic sheet is rotatably connected to a side of the first bracket away from the body. The second elastic sheet is rotatably connected to a side of the second bracket away from the body.

Based on the above, in the head mounted device of the application, the first elastic sheet and the second elastic sheet for contacting a user's head are elastic and rotatable, which may reduce the local pressure applied to the user's head and provide better wearing stability and comfort.

DESCRIPTION OF THE EMBODIMENTS

Figure 1:
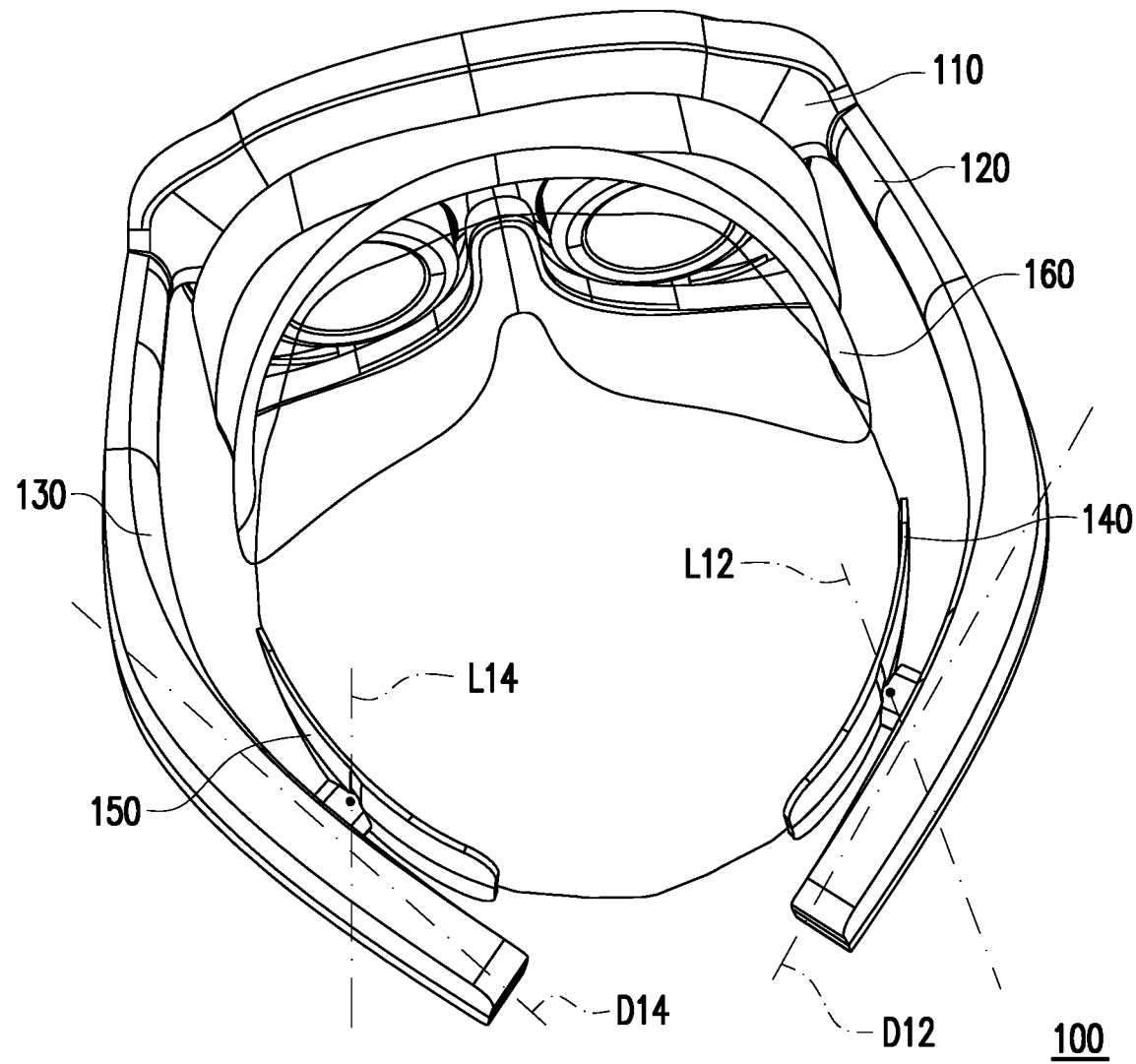
FIG. 1 is a schematic diagram of a head mounted device worn on a user's head according to an embodiment of the invention.

FIG. 1 is a schematic diagram of a head mounted device worn on a user's head according to an embodiment of the invention. Referring to FIG. 1, a head mounted device 100 according to this embodiment includes a body 110, a first bracket 120, a second bracket 130, a first elastic sheet 140, and a second elastic sheet 150. The first bracket 120 and the second bracket 130 are respectively connected to opposite sides of the body 110. The first elastic sheet 140 is rotatably connected to a side of the first bracket 120 away from the body 110. The second elastic sheet 150 is rotatably connected to a side of the second bracket 130 away from the body 110. The first bracket 120 and the second bracket 130 are used to provide clamping force, and the first elastic sheet 140 and the second elastic sheet 150 are used to contact the user's head. The clamping force provided by the first bracket 120 and the second bracket 130 is transmitted through a connection with the first elastic sheet 140 and the second elastic sheet 150, and then transmitted to the user's head by the first elastic sheet 140 and the second elastic sheet 150 in a more evenly distributed manner. Thus, local pressure on the user's head may be reduced and better wearing stability and comfort may be provided.

Figure 2:
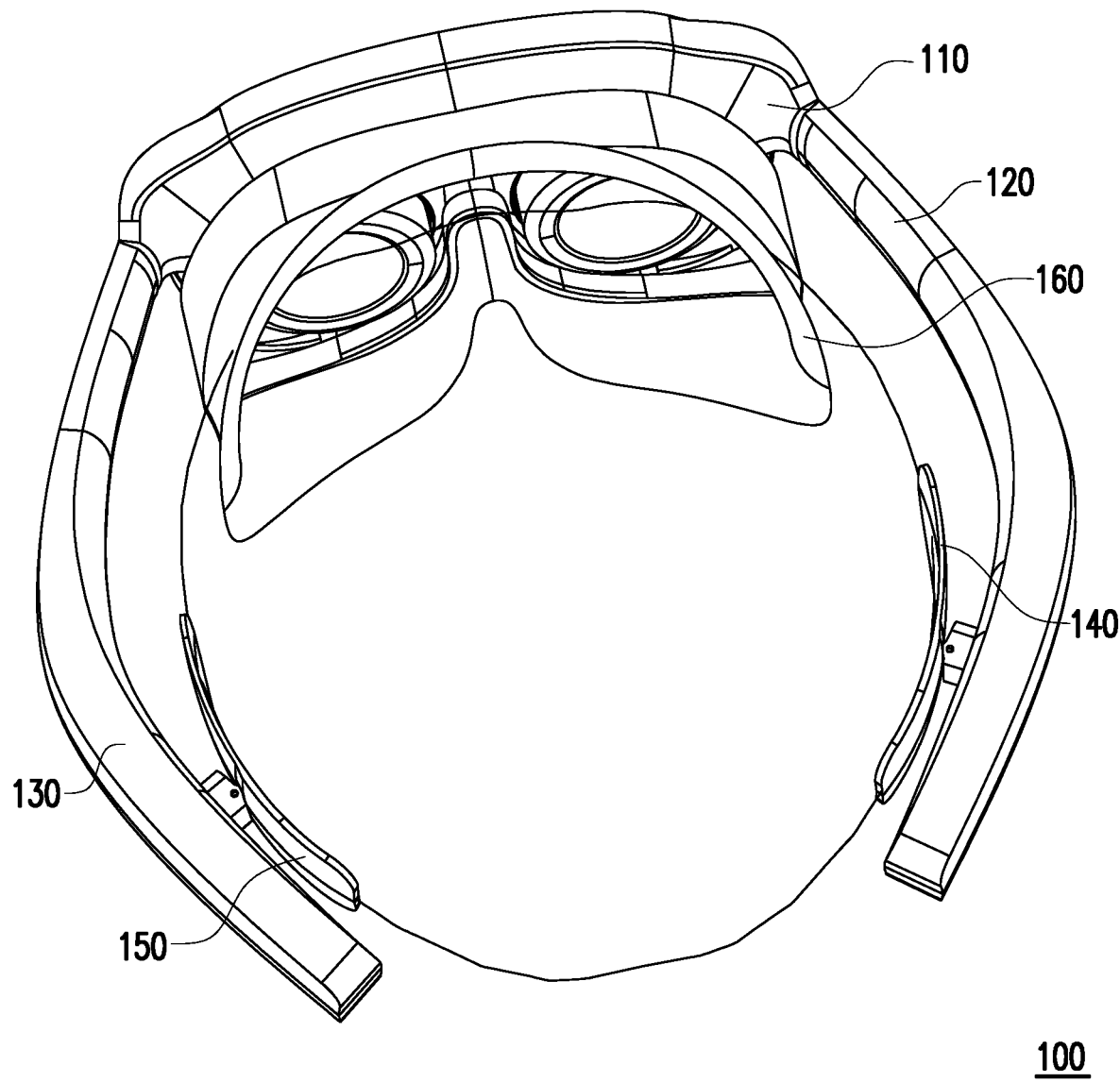
FIG. 2 is a schematic diagram of the head mounted device of FIG. 1 worn on another user's head.

FIG. 2 is a schematic diagram of the head mounted device of FIG. 1 worn on another user's head. Referring to FIG. 1 and FIG. 2, the user in FIG. 1 has a smaller head circumference, while the user in FIG. 2 has a larger head circumference. While the first bracket 120 and the second bracket 130 must be made of a harder material to provide clamping force when the head mounted device 100 is worn on different users' head, the first elastic piece 140 and the second elastic piece 150 are made of an elastic material, and the first elastic sheet 140 and the second elastic sheet 150 may rotate relative to the first bracket 120 and the second bracket 130. Therefore, the first elastic sheet 140 and the second elastic sheet 150 may be appropriately rotated to suit different user's head shape, thus allowing the force applied to the user's head by the first elastic sheet 140 and the second elastic sheet 150 to be distributed more evenly.

According to this embodiment, the body 110 is a head mounted display that can be applied to, for example, in the field of virtual reality system, augmented reality system, or mixed reality system, etc. The body 110 may include components such as an optical system and a protective casing, and may be equipped with a display or be suitable for placing a display. The display may be a built-in display or an external portable display (e.g. a smartphone, etc.), but the application is not limited thereto. The optical system includes optical elements for changing an optical path of a display, such as a lens, a light guide, or a prism. FIG. 1 shows the body 110 in a slightly larger form, but the body 110 may also be a more compact form or other forms.

According to this embodiment, the head mounted device 100 further includes a mask 160 assembled to the body 110 and used to contact the user's face. The mask 160, which touches the user's face, not only improve the stability of wearing the head mounted device 100, but also reduces interference when viewing images by blocking out external light, enhancing the user's experience.

According to this embodiment, when the head mounted device 100 is worn on the user's head, the first elastic sheet 140 is connected to the first bracket 120 in a position corresponding to a back of the user's head, and the second elastic sheet 150 is connected to the second bracket 130 in a position corresponding to the back of the user's head. Through this design, the head mounted device 100 may be stably worn on the user's head in a more force-balanced manner.

According to this embodiment, the first elastic sheet 140 rotates about a first axis L12 relative to the first bracket 120. The first axis L12 is perpendicular to an extension direction D12 of a portion of the first bracket 120 connected to the first elastic sheet 140. The second elastic sheet 150 rotates about a second axis L14 relative to the second bracket 130. The second axis L14 is perpendicular to an extension direction D14 of a portion of the second bracket 130 connected to the second elastic sheet 150. In terms of a wearing method of the head mounted device 100, the difference in the size of different users' head circumference is mainly reflected in a rotatable direction of the first elastic sheet 140 and the second elastic sheet 150 according to this embodiment, so the head mounted device 100 according to this embodiment may provide the same comfortable wearing experience and stability for different users.

Figure 3:
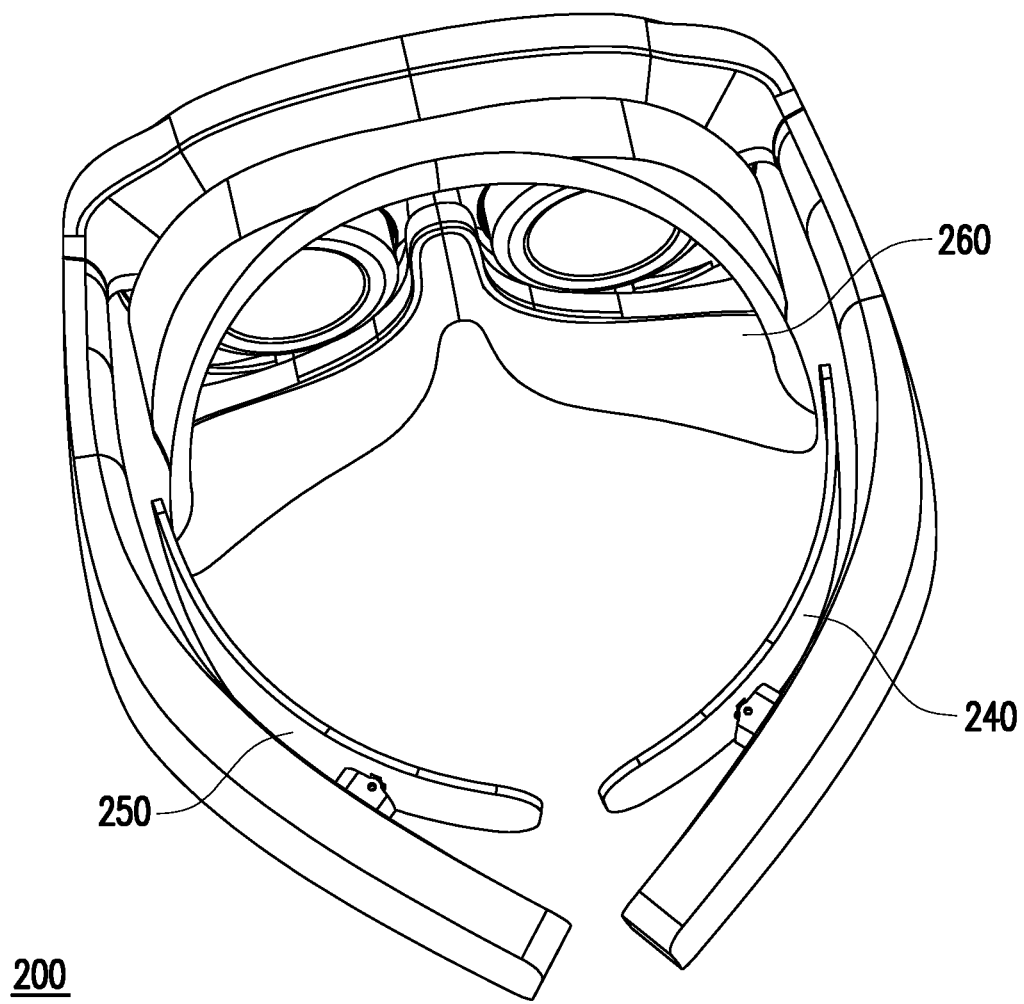
FIG. 3 is a schematic diagram of a head mounted device according to another embodiment of the invention.

FIG. 3 is a schematic diagram of a head mounted device according to another embodiment of the invention. Referring to FIG. 1 and FIG. 3, a head mounted display device 200 according to this embodiment is similar to the head mounted display device 100 of FIG. 1, and only the differences between them are described herein. According to this embodiment, when the head mounted display device 200 is worn on the user's head, a first elastic sheet 240 and a second elastic sheet 250 extend to the user's temples respectively. That is, compared with the first elastic sheet 140 and the second elastic sheet 150 in FIG. 1, the first elastic sheet 240 and the second elastic sheet 250 according to this embodiment have longer lengths, which may further improve the problem of excessive local pressure and enhance comfort and stability.

Figure 4:
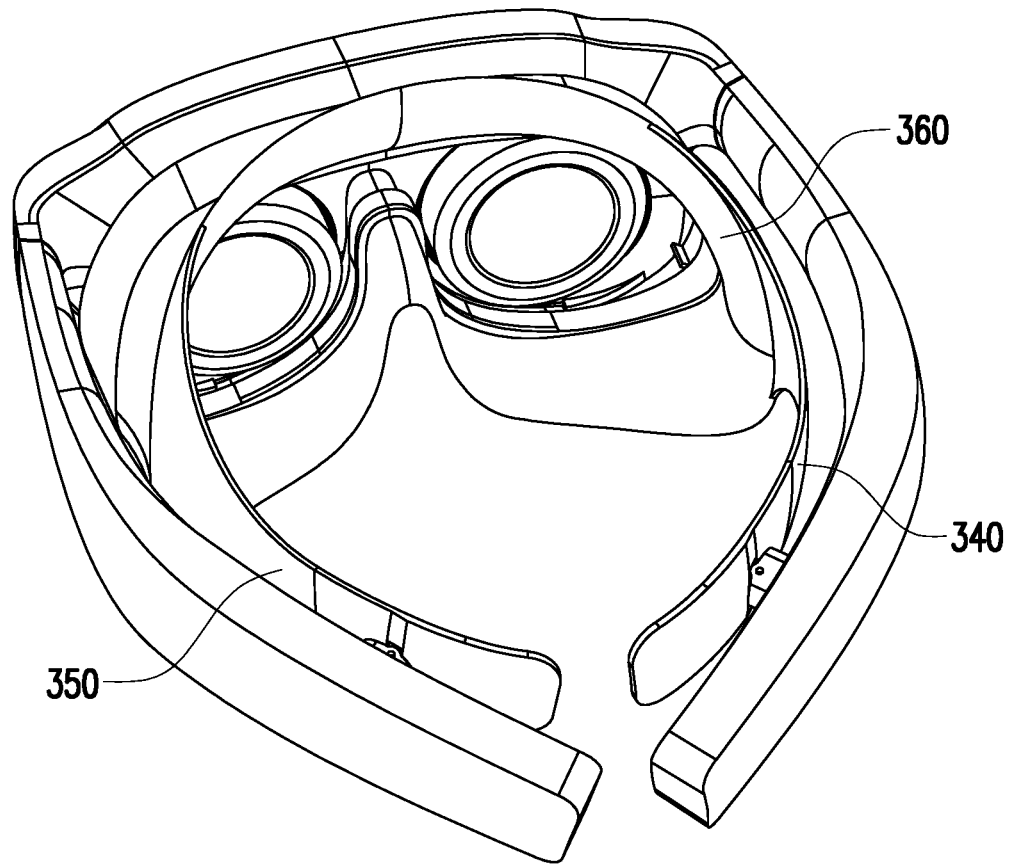
FIG. 4 is a schematic diagram of a head mounted device according to yet another embodiment of the invention.

FIG. 4 is a schematic diagram of a head mounted device according to yet another embodiment of the invention. Referring to FIG. 4, a head mounted display device 300 according to this embodiment is similar to the head mounted display device 200 of FIG. 3, and only the differences between them are described herein. According to this embodiment, a first elastic sheet 340 and the second elastic sheet 350 not only extend forward, but also a mask 360, the first elastic sheet 340, and the second elastic sheet 350 are formed as one piece. That is, the mask 360, the first elastic sheet 340, and the second elastic sheet 350 are different portions of a single element. In this way, not only is better coverage provided to enhance the stability and comfort when wearing the head mounted device 300, but also the interference is further reduced when viewing images by blocking out the external light. In more detail, the external light does not easily enter the space between the mask 360 and the user's face through areas of the user's end of eyes and affect the user's image viewing. A material of the integrated mask 360, the first elastic sheet 340, and the second elastic sheet 350 may be silicone, elastic fabric, foam, or other materials, but this application is not limited thereto.

To sum up, in the head mounted device of this application, the first elastic sheet and the second elastic sheet with elasticity are used to contact the user's head, so that the clamping force may be applied to the user's head in a more even manner and avoid excessive local pressure. In addition, regardless of the head shape, the elastic sheet may be rotated so that the clamping force may be applied to the user's head in a more even manner. Overall, the head mounted device of this application provides better wearing stability and comfort.

What is claimed is:

1. A head mounted device comprising:
a body;
a first bracket and a second bracket respectively connected to opposite sides of the body;
a first elastic sheet rotatably connected to a side of the first bracket away from the body, wherein the first bracket is connected to a portion of the first elastic sheet away from endpoints of the first elastic sheet; and
a second elastic sheet rotatably connected to a side of the second bracket away from the body, wherein the second bracket is connected to a portion of the second elastic sheet away from endpoints of the second elastic sheet.

2. The head mounted device according to claim 1, wherein when the head mounted device is worn on a user's head, the first elastic sheet is connected to the first bracket in a position corresponding to a back of the user's head, and the second elastic sheet is connected to the second bracket in a position corresponding to the back of the user's head.

3. The head mounted device according to claim 2, wherein the first elastic sheet and the second elastic sheet extend to the user's temples respectively.

4. The head mounted device according to claim 3 further comprising a mask assembled to the body and used to contact the user's face.

5. The head mounted device according to claim 4, wherein the mask, the first elastic sheet, and the second elastic sheet are formed as one piece.

6. The head mounted device according to claim 1, wherein the first elastic sheet rotates about a first axis relative to the first bracket, the first axis being perpendicular to an extension direction of a portion of the first bracket connected to the first elastic sheet, and the second elastic sheet rotates about a second axis relative to the second bracket, the second axis being perpendicular to an extension direction of a portion of the second bracket connected to the second elastic sheet.

7. The head mounted device according to claim 1, wherein the body is a head mounted display.

* * * * *